(12) United States Patent
Cakulev et al.

(10) Patent No.: US 8,849,203 B2
(45) Date of Patent: Sep. 30, 2014

(54) DISCOVERING PROXIMITY DEVICES IN BROADBAND NETWORKS

(75) Inventors: Violeta Cakulev, Millburn, NJ (US);
Ioannis Broustis, Millburn, NJ (US);
Semyon B. Mizikovsky, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 49 days.

(21) Appl. No.: 13/534,976

(22) Filed: Jun. 27, 2012

(65) Prior Publication Data

US 2014/0004796 A1 Jan. 2, 2014

(51) Int. Cl.
*H04B 7/00* (2006.01)

(52) U.S. Cl.
USPC ...................................... 455/41.2; 455/456.1

(58) Field of Classification Search
CPC .............................. H04W 64/00; H04W 76/02
USPC ............... 455/456.1, 456.6, 41.2, 422.1, 440, 455/436, 437; 370/252, 329, 338
See application file for complete search history.

(56) References Cited

U.S. PATENT DOCUMENTS

| | | | |
|---|---|---|---|
| 8,428,629 B2 * | 4/2013 | Li et al. ........................ | 455/500 |
| 2011/0117907 A1 | 5/2011 | Hooli et al. | |
| 2011/0244899 A1 | 10/2011 | Li et al. | |
| 2012/0011247 A1 | 1/2012 | Mallik et al. | |
| 2012/0265818 A1* | 10/2012 | Van Phan et al. ............. | 709/204 |
| 2013/0102314 A1* | 4/2013 | Koskela et al. ............... | 455/436 |
| 2013/0170398 A1* | 7/2013 | Kwon ........................... | 370/255 |
| 2013/0288608 A1* | 10/2013 | Fwu et al. .................... | 455/63.1 |
| 2013/0288668 A1* | 10/2013 | Pragada et al. ............ | 455/426.1 |
| 2013/0322276 A1* | 12/2013 | Pelletier et al. ............... | 370/252 |

OTHER PUBLICATIONS

International Search Report and Written Opinion for corresponding international patent application No. PCT/US2013/047870 dated Sep. 19, 2013.

* cited by examiner

*Primary Examiner* — Sonny Trinh
(74) *Attorney, Agent, or Firm* — Harness, Dickey & Pierce (57) ABSTRACT

A method of providing peer to peer discovery for a plurality of mobiles on a communications network, the plurality of mobiles including at least a first mobile and a second mobile, includes detecting, at a network element, that the first and second mobiles are in proximity with respect to one another; generating a determination result at the network element after the detecting, the determination result indicating whether the first and second mobiles are capable of establishing a direct device to device (D2D) link with one another based on signal reception qualities of the first and second mobiles; and generating a D2D capability message at the network element based on the determination result, the D2D capability message indicating that the first and second mobiles are capable of establishing a D2D link with one another.

12 Claims, 7 Drawing Sheets

DISCOVERING PROXIMITY DEVICES IN BROADBAND NETWORKS

BACKGROUND

1. Field

Example embodiments relate generally to device to device (D2D) communication between mobiles in a wireless communications network.

2. Related Art

In traditional wireless networks, all data being sent from and received by mobiles typically travels through a core network (CN). In peer to peer communications, mobiles communicate with each other, directly. Peer to peer communication may be used for at least public safety, data off-load, and social networking.

To improve public safety, peer to peer communication is used where the cellular infrastructure is unavailable. Peer to peer communication allows mobiles to communicate with each other directly in emergency situations.

Peer to peer communication can be used by the serving wireless system to off-load the data from the core network when it is exchanged between proximate mobiles.

Peer to peer communication is also used in social networking. More specifically, peer to peer communication allows proximate mobiles have to share information.

In order to establish a link between mobiles wishing to participate in a peer to peer communication, the mobiles must first discover one another.

SUMMARY

According to at least one example embodiment, a method of providing peer to peer discovery for a plurality of mobiles on a communications network, the plurality of mobiles including at least a first mobile and a second mobile, includes detecting, at a network element, that the first and second mobiles are in proximity with respect to one another; generating a determination result at the network element after the detecting, the determination result indicating whether the first and second mobiles are capable of establishing a direct device to device (D2D) link with one another based on signal reception qualities of the first and second mobiles; and generating a D2D capability message at the network element based on the determination result, the D2D capability message indicating that the first and second mobiles are capable of establishing a D2D link with one another.

According to at least one example embodiment, a method of providing peer to peer discovery for a plurality of mobiles on a communications network, the plurality of mobiles including at least a first mobile and a second mobile, may include receiving measurement instructions at the first mobile from a network element, the measurement instructions instructing the first mobile to measure a signal reception quality of the second mobile; measuring the signal reception quality of the second mobile at the first mobile based on the measurement instructions, and transmitting the signal measurements to the network element; and based on the signal measurements, receiving a discovery notification message at the first mobile indicating that the second mobile is capable of establishing a direct device to device (D2D) link with the first mobile, the discovery notification message not being received from the second mobile.

According to at least one example embodiment, a network element may include a processing unit configured to control operations for providing peer to peer discovery for a plurality of mobiles on a communications network, the plurality of mobiles including at least a first mobile and a second mobile. The operations may include detecting, at a network element, that the first and second mobiles are in proximity with respect to one another; generating a determination result at the network element indicating whether the first and second mobiles are capable of establishing a direct device to device (D2D) link with one another based on signal reception qualities of the first and second mobiles; and generating a D2D capability message at the network element based on the determination result, the D2D capability message indicating that the first and second mobiles are capable of establishing a D2D link with one another.

According to at least one example embodiment, a mobile device may include a processing unit configured to control operations for discovering mobiles from among a plurality of mobiles in a communications network for peer to peer communications. The operations may include receiving measurement instructions from a network element, the measurement instructions instructing the mobile device to measure a signal reception quality of a peer mobile; measuring the signal reception quality of the peer mobile based on the measurement instructions, and transmitting the signal measurements to the network element; and, based on the signal measurements, receiving a discovery notification message indicating that the peer mobile is capable of establishing a direct device to device (D2D) link with the first mobile, the discovery notification message not being received from the peer mobile.

BRIEF DESCRIPTION OF THE DRAWINGS

At least one example embodiment will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Various at least one example embodiment will now be described more fully with reference to the accompanying drawings in which some example embodiments are shown.

Detailed illustrative embodiments are disclosed herein. However, specific structural and functional details disclosed herein are merely representative for purposes of describing at least one example embodiment. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term mobile may be considered synonymous to, and may hereafter be occasionally referred to, as a terminal, user equipment (UE), mobile unit, mobile station, mobile user, access terminal (AT), subscriber, user, remote station, access terminal, receiver, etc., and may describe a remote user of wireless resources in a wireless communication network. The term enhanced Node B (eNB), may be considered synonymous to and/or referred to as a base station (BS), base transceiver station (BTS), NodeB, access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Device to Device (D2D) Communications

Figure 1A:
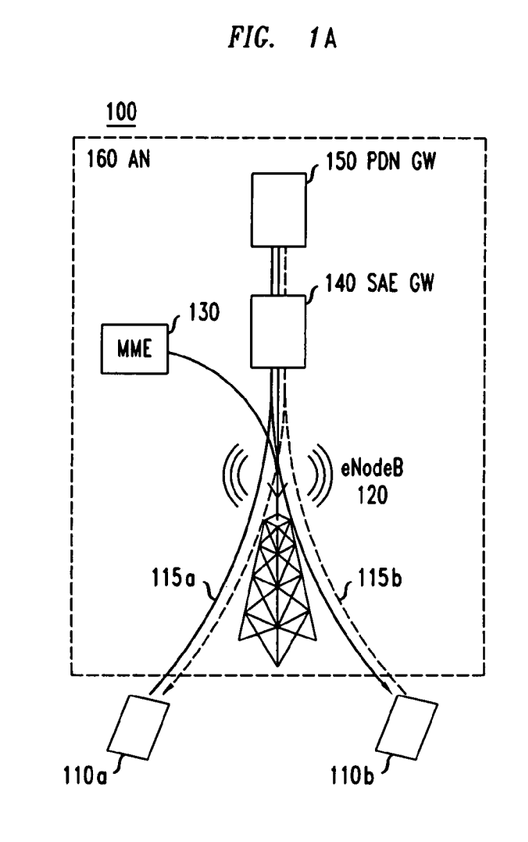
FIG. 1A is a diagram illustrating a portion of a wireless communications network.

FIG. 1A is a diagram illustrating a portion of a wireless communications network 100. Referring to FIG. 1A, wireless communications network 100 may follow, for example, a Long Term Evolution (LTE) architecture. Communications network 100 includes a plurality of mobiles including first and second mobiles 110a and 110b which are in communication with an access network AN 160. The AN 160 includes both radio access network (RAN) elements and core network (CN) elements. The AN 160 may include, for example, an enhanced NodeB (eNB) 120, a mobility management entity (MME) 130, a system architecture evolution (SAE) serving gateway (SGW) 140, and a packet data network (PDN) gateway (PGW) 150. The first and second mobiles 110a and 110b communicate with the AN 160 via the eNB 120. The eNB 120 is connected to the MME 130 for management signaling and SGW 140 for user data transport. The SGW 140 is connected to the PGW 150.

Each of the first and second mobiles 110a and 110b may send data to, and receive data from, the eNB 120 through respective, bidirectional, wireless communications links. The eNB 120 may provide wireless coverage for mobiles within a coverage area, or cell, of the eNB 120. The MME 130 handles management of mobiles connected to the AN 160. The SGW 140 provides access for the first eNB 120 to the PGW 150. The PGW 150 provides the first eNB 120 with access to other packet data networks including, for example the internet, via the SGW 140. Though not pictured, wireless communications network 100 may include other elements of an LTE CN.

The first and second mobiles 110A and 110B may be, for example, mobile phones, smart phones, computers, or personal digital assistants (PDAs).

Though wireless communications network 100 is discussed above as following LTE access technology, wireless communications network may follow any known access technology. Further, the wireless communications network 100 may be a time division duplexed (TDD) or frequency division duplexed (FDD) network. In frequency division duplex (FDD) links between the eNB 120 and each of the mobiles attached the eNB 120 are separated in spectrum: one part of the spectrum is allocated to the uplink and another part of the spectrum is allocated to the downlink. In time division duplex (TDD), the links are separated in time, but occupy the same spectrum. While some example embodiments have been described with reference to FDD and/or TDD, it should be understood that example embodiments should not be limited thereto and any other known method such as code division or orthogonal frequency-division multiplexing (OFDM), may be used.

Wireless network 100 represents an example of traditional broadband network design which focuses on enabling communication services among users, such that the user traffic always traverses the network core infrastructure. This approach offers some user management benefits to network operators, such as the ability to authenticate mobiles, and to track the user behavior in terms of resource utilization (e.g. bandwidth consumption on the air interface and amount of data traffic uploaded/downloaded over time). In addition, enforcing traffic to traverse the core of the broadband network enables the support of Lawful Interception (LI) of data and/or voice calls by law enforcement authorities. This is because the CN has explicit access to user traffic and thus can provide mechanisms to LI entities for obtaining the traffic exchanged between specific users, upon legally authorized request.

However, enforcing traffic to always traverse the CN introduces significant limitations and overheads in certain deployment scenarios. As an example, let us consider the case where two subscribers of the same long term evolution (LTE) network, namely first mobile 110a and second mobile 110b, which are attached to the same eNB, eNB 120, wish to establish a data communication so that they initiate a video call over LTE. In a traditional LTE setting, packets of the first mobile 110 and the second mobile 110b would be exchanged via the LTE CN. For example, as shown in FIG. 1, in the wireless communications network 100, packets sent from the first mobile 110a to the second mobile 110b may follow path 115a through the eNB 120, SGW 140 and PGW 150. Likewise, packets sent from the first mobile 110b to the second mobile 110b may follow path 115b, which also includes the eNB 120, SGW 140 and PGW 150.

For example, while first and second mobiles 110a and 110b are within each other's transmission range, packets of the first mobile 110a travel via the eNB 120 up to the PGW 150, terminate at the binding associated with the IP session of the first mobile 110a IP session, bridge to the binding associated with the IP session of the second mobile 110b, and from there packets return back to the same eNB, the eNB 120, and are delivered to the second mobile 110b. Given that multiple similar communication sessions among neighboring users may take place simultaneously, enforcing such traffic traversal via the CN increases the utilization of both the radio access network (RAN) entities (e.g. the eNB 120) and the CN entities (e.g. the SGW 140 and PGW 150), and additionally consumes excessive amounts of both backhaul and wireless bandwidth.

For deployment scenarios where the first and second mobiles 110a and 110b are neighbors, proximity services (ProSe) may improve resource utilization by enabling Device-to-Device (D2D) traffic session establishment and data exchange directly between two or more mobiles. As used herein with respect to mobiles, the term 'neighbors' defines mobiles that are within each other's D2D transmission ranges.

Figure 1B:
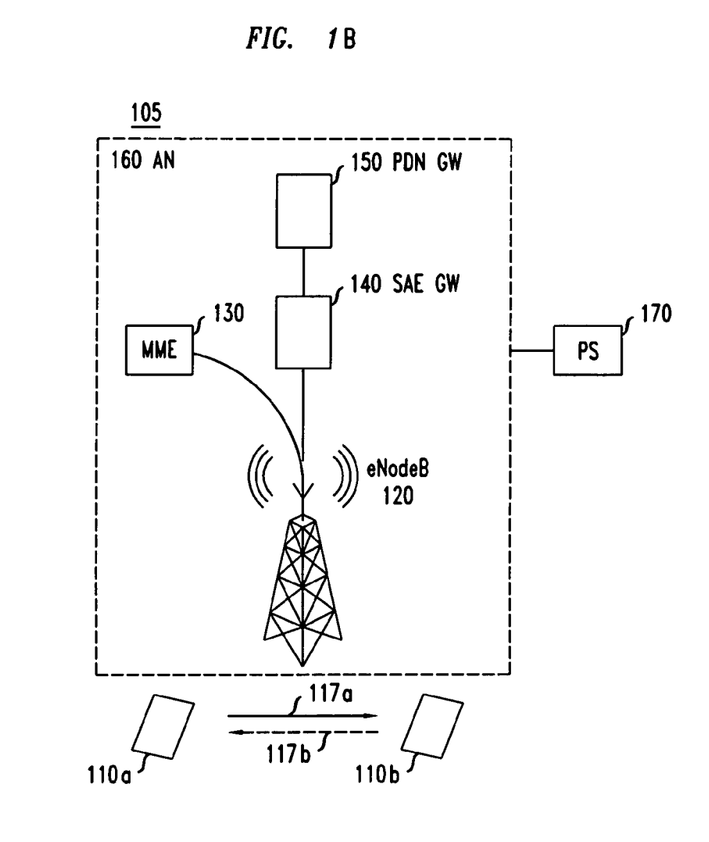
FIG. 1B is a diagram illustrating a portion of a wireless communications network according to example embodiments.

FIG. 1B is a diagram illustrating a portion of a wireless network 105 according to at least one example embodiment.

The wireless network 105 supports ProSe and D2D communication between mobiles. The structure of the wireless network 105 is substantially similar to that discussed above with reference to the wireless network 100 illustrated in FIG. 1A. Accordingly, only those aspects which differ will be discussed. In the wireless network 105, the first and second mobiles 110a and 110b may perform D2D communication by sending data to one another directly, without first sending that data through the AN 160, as is indicated by communications paths 117a and 117b.

In order to enable D2D communications, mobiles included in the wireless network 105 may include base station receiving and/or transmitting functions. The base station receiving function is the ability to receive data that has been transmitted on an uplink channel by a mobile. The base station transmitting function is the ability to transmit data over a downlink channel in a manner that can be decoded by a mobile. In the case where the wireless network 105 is a FDD network, mobiles included in the wireless network 105 may include a base station transmission and/or receiving module in order to enable base station transmission and/or reception. In the case where the wireless network 105 is a TDD network, an additional module may not be required to enable base station transmission and/or reception. Base station transmission and reception abilities in mobiles are discussed in U.S. application Ser. No. 13/425,957, the entire contents of which are incorporated herein by reference.

Further, the wireless network 105 includes a proximity server (PS) 170. The PS 170 may store information including location, authentication and/or discoverability preference information of mobiles in the wireless network 105. The PS 170 may communicate with the first and second mobiles 110a and 110b through the AN 160. The PS 170 may be, for example, connected to the AN 160 through the PGW 150 via the internet. Further, though in the example illustrated in FIG. 1B, the PS 170 is depicted as being outside the AN 160, according to at least one example embodiment, the PS may be part of the AN 160. For example, the PS 170 may be implemented by a CN element of the AN 160. The PS 170 will be discussed in greater detail below with reference to FIGS. 2B-7.

The ability for the first mobile 110a to send traffic directly to the second mobile 110b over the air interface, without the need to involve either the RAN or the CN infrastructure, may offer at least two main advantages: (i) the network may be offloaded in terms of data traffic resource utilization, and (ii) increase the end-user throughput may be increased when the direct data link between the first and second mobiles 110a and 110b sustains a higher packet delivery ratio (PDR) than the first mobile 110a-to-eNB 120 and/or second mobile 110b-to-eNB 120 links. However, an important aspect for enablement of D2D communication through ProSe is providing means for mobiles to realize that they are in proximity of each other. The above-referenced process of mobiles determining other proximate mobiles is referred to herein as peer discovery, peer to peer discovery, or ProSe discovery.

One conventional peer discovery mechanism uses a small fraction of dedicated time-slots to discover the presence of other nodes in the neighborhood (up to 1 km range). This long range discovery is done by using rate-less codes to broadcast peer identities that enable discovery at extremely low SNR (signal to noise ratio) values over moderate timescales (about 10 seconds to discover around 1000 devices over a 1 km range). A small number of time slots are dedicated for the purpose of peer discovery (about 20 msec every 1 second). This time slot is used for transmitting as well as receiving presence information of nearby nodes. According to this conventional peer discovery mechanism, all devices are required to participate in peer discovery even if they are not actively communicating with other devices. Thus, the above-referenced peer-discovery mechanism may present difficulties with respect to scalability and convergence.

Apparatus and Method for Providing Wireless Network Facilitated ProSe Discovery

According to at least one example embodiment, ProSe discovery can be facilitated by the use of one or more network elements included in the wireless network infrastructure. For example, according to at least one example embodiment, it is assumed that ProSe-capable mobiles do not discover each other directly (i.e., by exchanging direct advertisements), but only via the wireless network infrastructure. The wireless network facilitated peer to peer discovery method according to example embodiments may be more advantageous than the conventional peer discovery mechanism discussed above in that the discovery method according to at least one example embodiment is based on centralized knowledge about mobile locations and proximities. This centralized knowledge makes it easier to scale and converge the wireless network facilitated peer to peer discovery method than the conventional peer discovery mechanism discussed above. In addition, the wireless network facilitated ProSe discovery method enables the network operator to offer customized social networking services to subscribers, by controlling which users are discoverable, when, and by whom, as will be explained in greater detail below.

Apparatuses and methods for providing ProSe discovery according to at least one example embodiment will now be discussed in greater detail below with reference to FIGS. 2A-7.

Figure 2A:
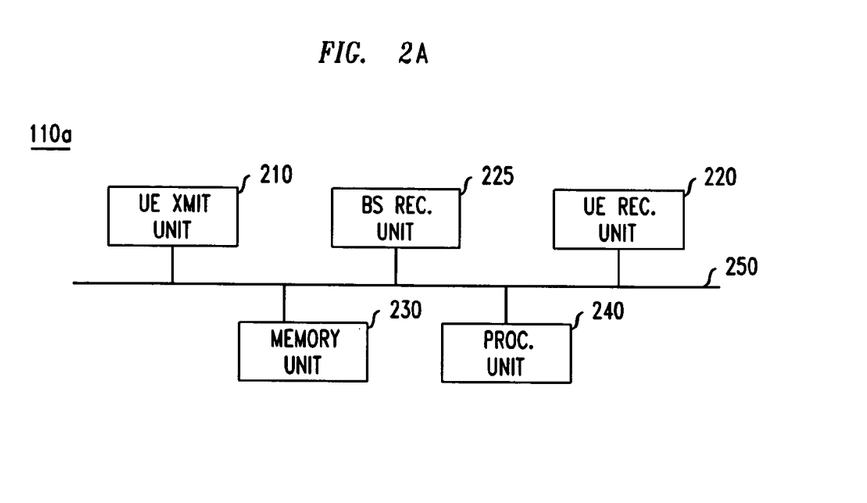
FIG. 2A illustrates an example structure of the first mobile 110a illustrated in FIG. 1B with respect to an example in which the first mobile 110a has base station receiving functionality.

FIG. 2A is a diagram illustrating an example structure of the first mobile 110a illustrated in FIG. 1B with respect to an example in which the first mobile 110a has base station receiving functionality. While only the first mobile 110a is shown, it should be understood that other mobiles in the wireless communications network 105, including the second mobile 110b, may have the same structure.

The first mobile 110a, shown in FIG. 2A, is configured to receive data from a neighboring mobile (e.g., the second mobile 110b) over an uplink channel of a network. The first mobile 110a is configured to receive control information for reception over a bi-directional link between the first mobile 110a and a base station. The first mobile 110a is configured to listen in designated slots of an uplink channel of the network. The first mobile 110a may be configured to receive transmission parameters from a base station and may be configured to determine reception parameters based on the transmission parameters. The first mobile 110a may be configured to directly communicate with the peer mobile in a half-time-duplex mode. The first mobile 110a may be configured to directly communicate with the peer mobile in a full-time duplex mode.

The first mobile 110a may include, for example, a UE transmitting unit 210, a UE receiving unit 220, a base station receiving unit 225, a memory unit 230, a processing unit 240, and a data bus 250.

The UE transmitting unit 210, UE receiving unit 220, base station receiving unit 225, memory unit 230, and processing unit 240 may send data to and/or receive data from one another using the data bus 250. The UE transmitting unit 210 is a device that includes hardware and any necessary software for transmitting wireless signals on the uplink (reverse link) including, for example, data signals, control signals, and signal reception quality information via one or more wireless connections to other wireless devices (e.g., base stations).

The UE receiving unit 220 is a device that includes hardware and any necessary software for receiving wireless signals on the downlink (forward link) channel including, for example, data signals, control signals, and signal reception quality information via one or more wireless connections from other wireless devices (e.g., base stations). The UE receiving unit 220 receives control information for reception over a bi-directional link between the first mobile 110a and the eNB 120. The first mobile 110a listens in designated slots of an uplink (reverse link) of the network.

The base station receiving unit 225 is implemented, for example, as a receiver chain including a low noise amplifier, mixer, filter, and baseband processor configured to receive signals transmitted on an uplink channel.

The memory unit 230 may be any storage medium capable of storing data including magnetic storage, flash storage, etc.

The processing unit 240 may be any device capable of processing data including, for example, a microprocessor configured to carry out specific operations based on input data, or capable of executing instructions included in computer readable code. For example, the processing unit 240 may control operations including measuring reception qualities of signals received from peer mobiles.

Figure 2B:
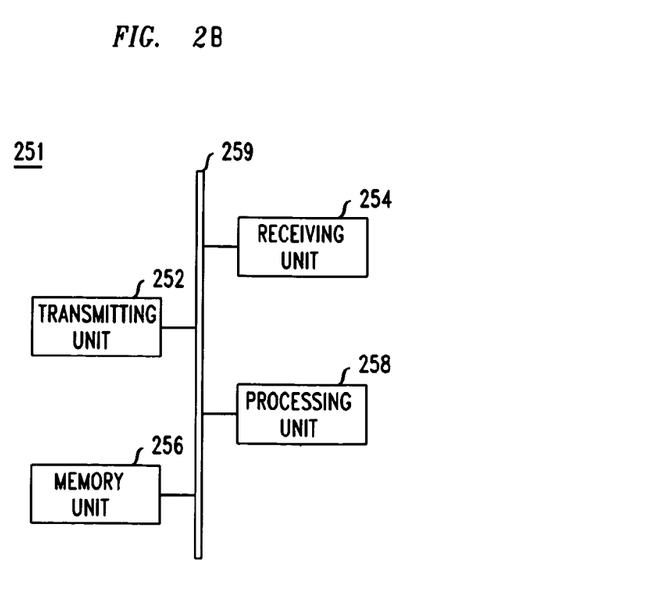
FIG. 2B is a diagram illustrating an example structure of a network element.

FIG. 2B is a diagram illustrating an example structure of a network element 251. According to at least one example embodiment, the network element 251 may represent any device within the AN 160 of FIG. 1B. For example, the MME 130 illustrated in FIG. 1B may include the structure described below with reference to the network element 251.

Further, the PS 170 may include the structure described below with reference to the network element 351.

Referring to FIG. 2B, the network element 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals, and media data including video and/or audio data via one or more wired and/or wireless connections to other network elements in communications network 105.

The receiving unit 254 is a device that includes hardware and any necessary software for receiving wireless signals including, for example, control signals, and media data including video and/or audio data via one or more wired and/or wireless connections to other network elements in communications network 105.

The memory unit 256 may be any device capable of storing data including magnetic storage, flash storage, etc.

The processing unit 258 may be any device capable of processing data including, for example, a microprocessor configured to carry out specific operations based on input data, or capable of executing instructions included in computer readable code which may be stored, for example, in the memory unit 256.

Figure 3:
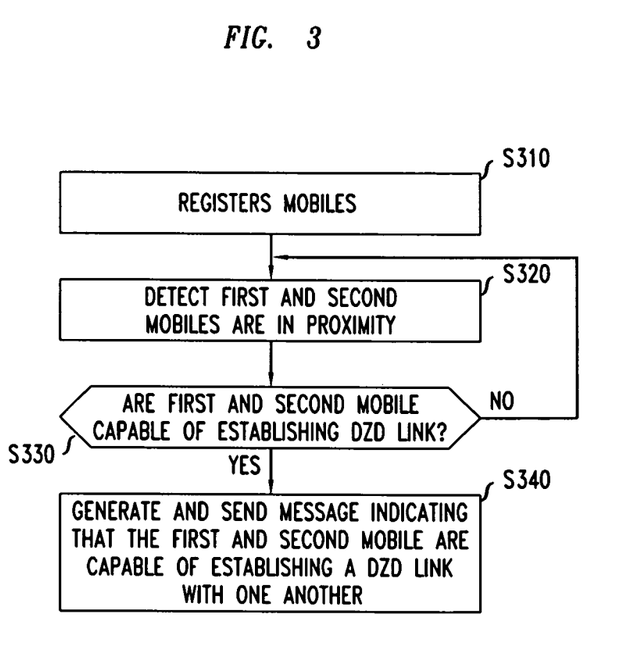
FIG. 3 is a flow chart illustrating a method of providing network assisted peer to peer discovery from a network perspective.
Figure 4:
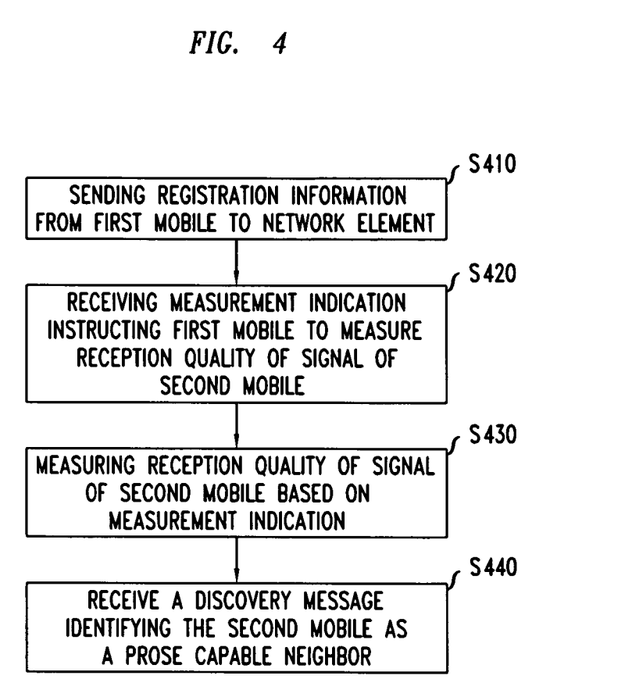
FIG. 4 is a flow chart illustrating a method of providing network assisted peer to peer discovery from a mobile perspective.

Methods for providing peer to peer discovery according example embodiments will now be discussed in greater detail below with reference to FIGS. 3-7. FIGS. 3 and 4 are flow charts illustrating general methods of providing peer to peer discovery according to example embodiments.

FIG. 3 is a flow chart illustrating a method of providing network assisted peer to peer discovery from a network perspective. FIG. 3 will be described with reference to network 105 in FIG. 1B. According to at least one example embodiment, operations described below as being performed by the AN 160 may be performed or controlled by the MME 130 including the structure of the network element 251 illustrated in FIG. 2B as implemented. For example, the memory unit 256 may store executable instructions corresponding to each of the operations described below with reference to FIGS. 3 and 5-7. Further, the processing unit 258 may be configured perform each of the operations described below with respect to FIGS. 3 and 5-7, for example, by executing executable instructions stored in the memory unit 256.

Referring to FIG. 3, in step S310, mobiles are registered. The mobiles may register with the AN 160 and the PS 170.

For example, the first and second mobiles 110*a* and 110*b* may register with the AN 160 in accordance with known registration procedures. During registration with the AN 160, the first and second mobiles 110*a* and 110*b* may provide the AN 160 with information including a global identifier, for example, an international mobile subscriber identity (IMSI). Further, the AN 160 may assign to each of the first and second mobiles 110*a* and 110*b* a network-specific identifier, for example, a temporary mobile subscriber identity (TMSI) or globally unique temporary identity (GUTI).

Registration information received from each of the first and second mobiles 110*a* and 110*b* may also include information indicating whether or not the mobiles are capable of participating in ProSe communications.

Additionally, registration information received from each of the first and second mobiles may include or allow the network to determine the discoverability preference information. The discoverability preference information may indicate specific users, classes of users, or groups of users each of the first and second mobiles wish to be discoverable or not discoverable by. The discoverability preference information may be based on user set preferences, operator policy, resource utilization criteria, subscription limitations, and other considerations, and can be mobile centric, network imposed, or both.

According to known methods, based on the registration information received from the first and second mobiles 110*a* and 110*b*, the AN 160 may perform an authorization procedure to determine whether or not the first and second mobiles are authorized to attach to the eNB 120. Additionally, the AN 160 may perform an authorization procedure to determine whether or not the first and second mobiles 110*a* and 110*b* are authorized to participate in ProSe communications.

According to at least one example embodiment, information received at the AN 160 may be forwarded by the AN 160 to, and stored at, the PS 170. Accordingly, registration of the mobiles at both the AN 160 and the PS 170 may be accomplished based on information sent from the mobiles to the AN 160. Alternatively, in step S310, the AN 160 and PS 170 may receive registration information from the first and second mobiles 110*a* and 110*b* through different messages. For example, the registration messages sent to the PS 170 may include discoverability preference information while the registration messages sent to the AN 160 may not.

After the mobiles are registered with the AN 160 and the PS 170, and the AN 160 determines that the first and second mobiles 110*a* and 110*b* are authorized to communicate with the AN 160 and to participate in ProSe communications, proximity detection begins in step S320. According to example embodiments, proximity detection may be accomplished either by the AN 160 or by the PS 170.

According to at least one example embodiment, the AN 160 may monitor the location of the first and second mobiles 110*a* and 110*b*. For example, through known methods, the AN 160 may keep track of the cell or location area in which each of the first and second mobiles 110*a* and 110*b* are located. The AN 160 may determine whether the first and second mobiles 110*a* and 110*b* are in proximity with one another based on whether or not the first and second mobiles 110*a* and 110*b* are in the same cell or location area.

According to at least one example embodiment, the PS 170 may monitor the location of the first and second mobiles 110*a* and 110*b*. For example, the first and second mobiles 110*a* and 110*b* may periodically send location messages to the PS 170 indicating geographical locations of the first and second mobiles 110*a* and 110*b*. The location information may include, for example, serving cell ID, GPS coordinates, information obtained from eNB triangulation, location information provided by application clients in the mobile device such as Google Maps and Nokia Ovi Maps, etc. The PS 170 may determine whether the first and second mobiles 110*a* and 110*b* are in proximity with one another based on whether or not current locations of the first and second mobiles 110*a* and 110*b* are within a reference distance of one another. As will be discussed in greater detail below with reference to FIG. 7, if the PS 170 determines the first and second mobiles 110*a* and 110*b* are in proximity, the PS 170 may send a message to the first and second mobiles 110*a* and 110*b* causing the first and second mobiles to send a message to the AN 160 indicating that the first and second mobiles are in proximity. Accordingly, the AN 160 may determine that the first and second mobiles are in proximity based on the determination made by the PS 170.

In step S330, the AN 160 determines whether or not the first and second mobiles are capable of participating in ProSe communications. For example, after the AN 160 of the PS 170 determines that the first and second mobiles 110*a* and 110*b* are in proximity with one another, the AN 160 may instruct the first mobile 110*a* to monitor reception quality of a transmission of the second mobile 110*b*, and vice versa. The first and second mobiles 110*a* and 110*b* may report the signal reception quality measurements to the AN 160. The AN 160 may determine whether or not the reception quality of transmissions received at the first mobile 110*a* from the second mobile 110*b* and the reception quality of transmissions received at the second mobile 110*b* from the first mobile 110*a* are sufficient to support a D2D link between the first and second mobiles 110*a* and 110*b*.

For example, in current LTE uplink operation, each mobile transmits a sounding reference signal (SRS) that is then received by the eNB. The eNB uses its measurement of the SRS along with its knowledge of the mobile's power headroom, to determine the signal to interference plus noise (SINR) ratio that the mobile can achieve on the uplink at any given transmit power. Thus the eNB is able to monitor each mobile to eNB link.

Since neither end of the D2D link terminates at the eNB, a different approach is employed as an example. According to at least one example embodiment, step S330 may include the following. Referring to FIG. 1B, each of the first and second mobiles 110*a* and 110*b* is informed (for example, by the eNB 120) of the SRS parameters (for example, times of transmission, resources used, orthogonal cover, etc.) of the other. Each of the first and second mobiles 110*a* and 110*b* measures the SINR at which the mobile receives the other mobile's SRS. Each mobile reports back (for example, to the eNB 120) the SRS SINR of the other as well as the mobile's own power headroom.

The eNB 120 can use the reports received from the first and second mobiles 110*a* and 110*b* to determine the D2D link quality in either direction, i.e. the rates of transmission that are supportable on the D2D link at any given mobile transmit power. According to at least one example embodiment, the eNB 120 has knowledge of the D2D link, and not the individual first and second mobiles 110a and 110b, because each mobile may not be aware of the power headroom of the other.

Accordingly, the AN 160 can compare the rates of transmission which are determined to be supportable to a reference transmission rate. If the AN 160 determines that the supportable transmission rates of a potential D2D link between the first and second mobiles 110a and 110b are not above the reference transmission rate, the method returns to step S320 where proximity detection continues for mobiles in the wireless communications network 105.

If the AN 160 determines that the reception quality of the forward links by the first and second mobiles are sufficient to support a D2D link, for example by determining that the supportable rates of transmission are above a reference transmission rate, the method proceeds to step S340. In step S340, a ProSe capable notification message indicating that the first and second mobiles 110A and 110B are capable of participating in ProSe communications is generated and sent.

According to at least one example embodiment, the ProSe capable notification message generated in step S340 may be generated by the AN 160 and sent to the PS 170. As will be discussed in greater detail below with reference to FIG. 5, in response to the message from the AN 160 indicating that the first and second mobiles 110a and 110a are capable of participating in ProSe communications, the PS 170 may verify this with the first and second mobiles 110a and 110b. Based on the verification, the PS 170 may send a discovery message to the first mobile 110a identifying the second mobile 110b as a neighbor of the first mobile 110a, and send a discovery message to the second mobile 110b identifying the first mobile 110a as a neighbor of the second mobile 110b. The first and second mobile 110a and 110b discover one another as possible ProSe communication participants upon receipt of the respective discovery messages.

According to at least one example embodiment, the message generated in step S340 may be generated by the AN 160 and sent to each of the first and second mobiles 110a and 110b. As will be discussed in greater detail below with reference to FIG. 6, in response to the message indicating that the first and second mobiles 110a and 110b are capable of participating in ProSe communications, the first and second mobiles 110a and 110b may each send verification request messages to the PS 170. In response to the verification request messages, the PS 170 may verify this with the first and second mobiles 110a and 110b. Based on the verification, the PS 170 may send a discovery message to the first mobile 110a identifying the second mobile 110b as a neighbor of the first mobile 110a, and send a discovery message to the second mobile 110b identifying the first mobile 110a as a neighbor of the second mobile 110b. The first and second mobile 110a and 110b discover one another as possible ProSe communication participants upon receipt of the respective discovery messages.

FIG. 4 is a flow chart illustrating a method of providing network assisted peer to peer discovery from a mobile perspective. FIG. 3 will be described with reference to the first mobile 110a included in network 105 illustrated in FIG. 1B.

Referring to FIG. 4, in step S410, the first mobile 110a sends registration information to the AN 160. The first mobile 110a may register with the AN 160 according to known methods. According to at least one example embodiment, in addition to sending registration information to the AN 160, the first mobile 110a may send registration information to the PS 170. As is discussed above with reference to FIG. 3, the registration information sent by the first mobile 110a in step S410 may include a global identifier of the first mobile 110a, an indication that the first mobile 110a is capable of participating in ProSe communications, and discoverability preference information of the first mobile 110a.

In step S420, the first mobile 110a receives an indication to measure the reception quality of signals of a second mobile. For example, the first mobiles 110a may receive instructions form the AN 160 to measure a reception quality of signals received from the second mobile 110b.

In step S430, the first mobile 110a measures the reception quality of signals received from the second mobile based on the indication received in step S440. For example, the first mobile 110a may measure the reception quality in the manner discussed above with reference to step S330 in FIG. 3. The first mobile 110a may send the results of the signal measurement back to the AN 160.

In step S440, the first mobile 110a receives a discovery message identifying the second mobile 110b a ProSe capable neighbor mobile. For example, based on the signal reception quality measurements sent by the first mobile 110a in step S430 and corresponding signal measurements sent by the second mobile 110b, the AN 160 may determine that the first and second mobiles 110a and 110b are capable of participating in ProSe communications. As a result, as is described above with reference to FIG. 3, the AN 160 may generate a ProSe capability message which causes the PS 170 to perform a verification procedure. If the verification procedure is successful, the PS 170 may send the discovery message received by the first mobile 110a in step S440.

Figure 5:
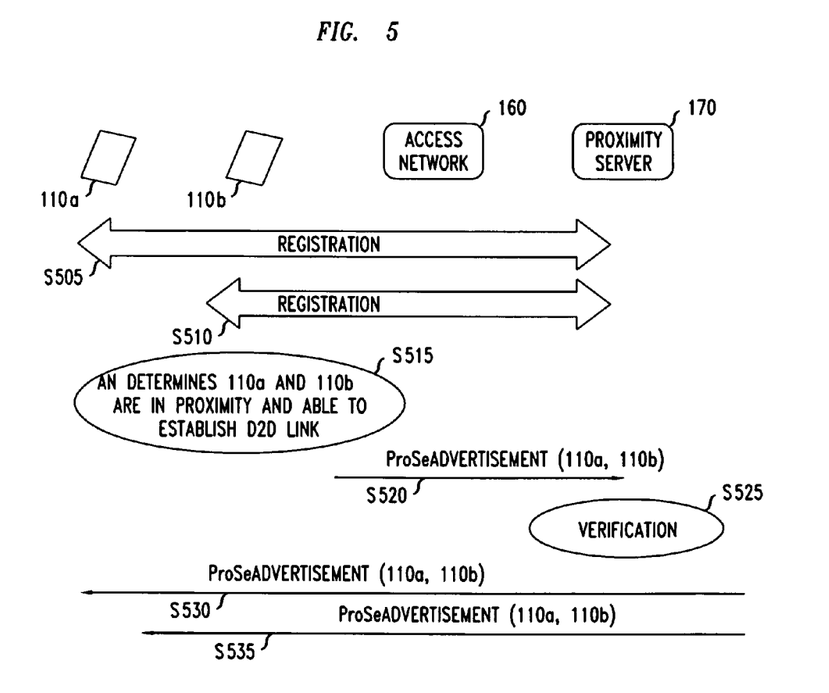
FIG. 5 is a communication flow diagram illustrating an example implementation of the peer to peer discovery methods described above with reference to FIGS. 3 and 4 using access network (AN) assisted proximity detection.
Figure 6:
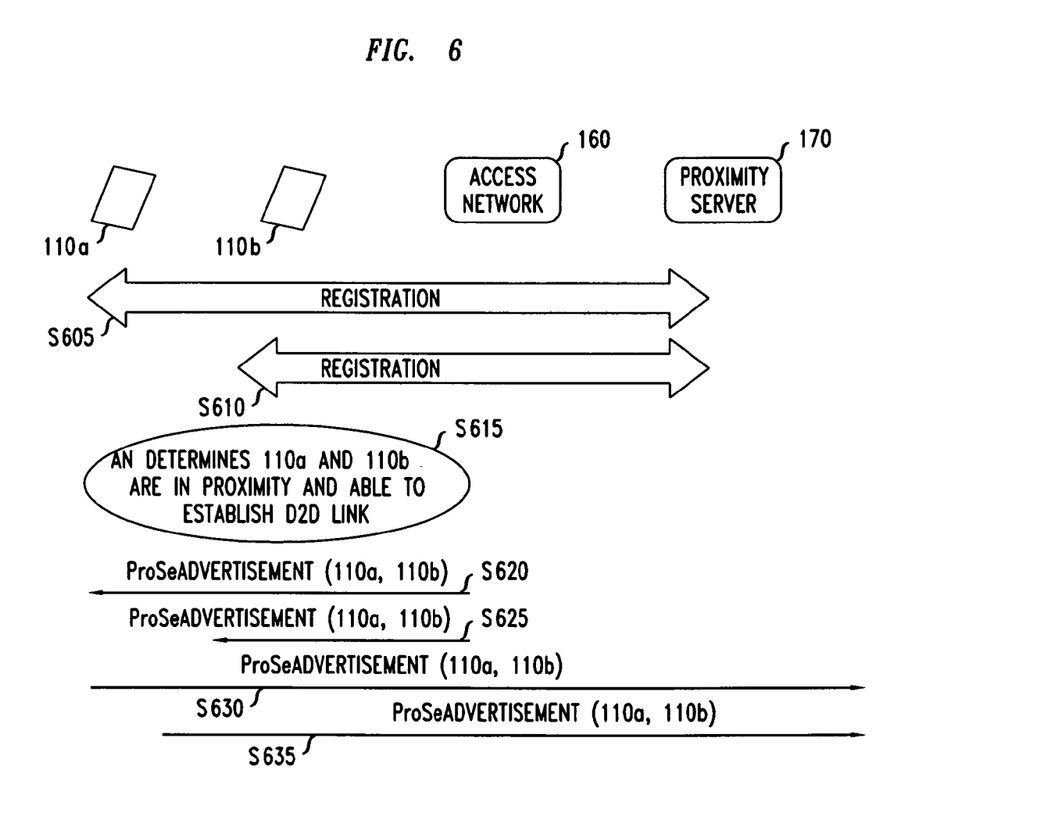
FIG. 6 is a communication flow diagram illustrating another example implementation of the peer to peer discovery methods described with reference to FIGS. 3 and 4 using AN assisted proximity detection.
Figure 7:
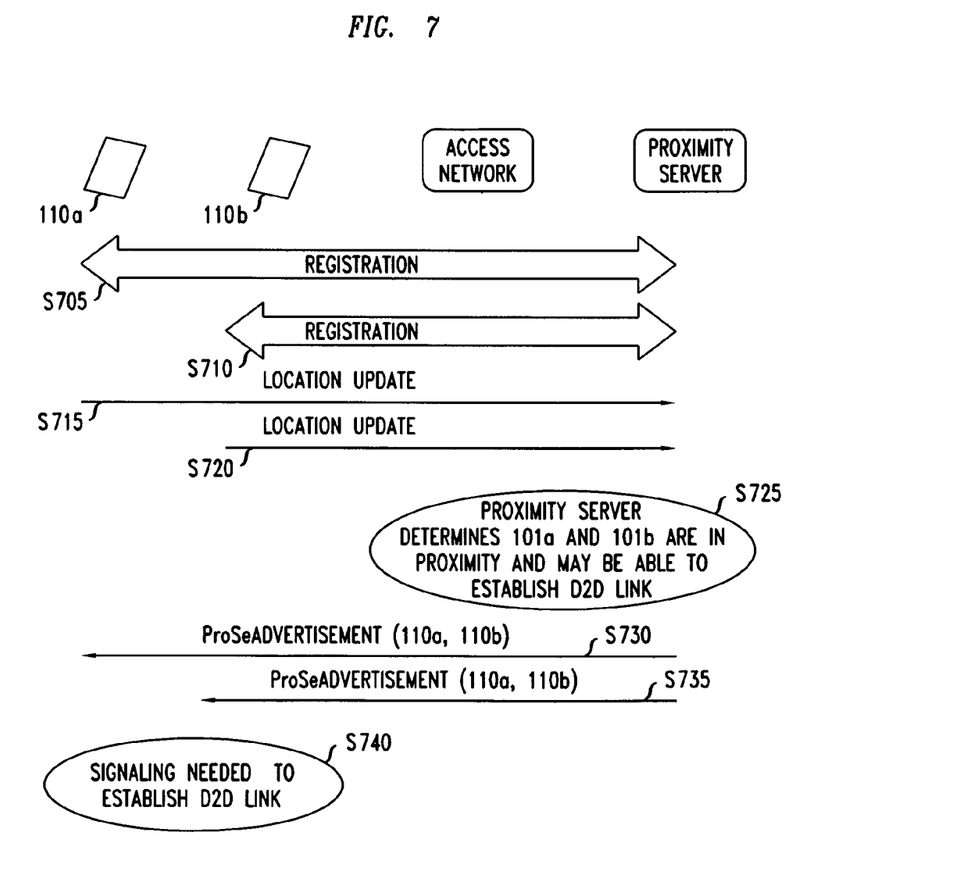
FIG. 7 is a communication flow diagram illustrating an example implementation of the peer to peer discovery methods described above with reference to FIGS. 3 and 4 using PS assisted proximity detection

According example embodiments, some example implementations of the general peer to peer discovery methods illustrated in FIGS. 3 and 4 include AN assisted peer to peer discovery methods, while some other example implementation include PS based peer to peer discovery methods. FIGS. 5-7 are communication flow diagrams illustrating three different example implementations of peer to peer discovery based on the methods illustrated in FIGS. 3 and 4. FIGS. 5-6 illustrate examples of peer to peer discovery methods using AN assisted proximity detection. FIG. 7 illustrates an example of a peer discovery method using PS assisted proximity detection. FIGS. 5-7 will be discussed below with reference to the wireless communications network 105 illustrated in FIG. 1B.

Referring to FIG. 5, as is discussed above, FIG. 5 is a communication flow diagram illustrating example implementation of the peer to peer discovery methods described above with reference to FIGS. 3 and 4 using AN assisted proximity detection.

In steps S505 and S510 the first and second mobiles 110a and 110b register with the AN 160 in the manner described above with reference to FIGS. 3 and 4.

In step S515, the AN 160 determines that the first and second mobiles 110a and 110b are in proximity and capable of participating in ProSe communications by establishing a D2D link. For example, as is described in FIGS. 3 and 4 above, the AN 160 may determine the first and second mobile device 110a and 110b are in proximity with one another based on location information received from the first and second mobiles 110a and 110b including, for example, information indicating a cell or location area of the first and second mobiles 110a and 110b. Further, as is described in FIGS. 3 and 4 above, the AN 160 may instruct the first and second mobiles 110a and 110b to measure each other signal transmission strengths, receive the measured signal transmission strengths and determine whether or not the signal transmission strengths are sufficient to support a D2D link.

In the example illustrated in FIG. 5, in step S515 the AN 160 determines the first and second mobiles 110a and 110b are in proximity and are capable of participating in ProSe communications.

In step S520, the AN 160 sends a ProSe capability notification message to the PS 170 indicating that the first and second mobiles 110a and 110b are capable of establishing a D2D link.

In step S525, the PS 170 performs a verification operation in response to the ProSe capability notification message. The verification operation may include determining, at the PS 170, whether or not the first and second mobiles 110a and 110b are authorized to participate in ProSe communications. Further, the PS 170 may consult discoverability preference information received during the registration process in steps S505 and S510 to determine whether the first mobile 110a is allowed to discover the second mobile 110b, and whether the second mobile 110b is allowed to discover the first mobile 110a.

In the example illustrated in FIG. 5, in step S525, the PS 170 determines the first and second mobiles are authorized to participate in ProSe communications. Further each of the first and second mobile devices 110a and 110b is defined as being discoverable by the other in their discoverability preferences.

After verifying the first and second mobiles 110a and 110b in step S525, in steps S530 and S535 the PS 170 sends discovery messages to the mobiles 110a and 110b respectively indicating that the second mobile 110b and the first mobile 110a are ProSe capable neighbor mobiles. Accordingly, the first and second mobiles 110a and 110b discover each other with the help of network elements AN 160 and PS 170. The first and second mobiles 110a and 110b may now establish a D2D link according to known methods.

Note that with the example implementation illustrated in FIG. 5, the PS 170 is informed about the fact that the first and second mobiles 110a and 110b are in proximity only via the AN, and upon verification by the AN the first and second mobiles 110a and 110b can indeed communicate directly. Observe also that in this scenario (based on policy) PS can perform additional verifications. For example, subscribers can register with the PS 170 and indicate to the PS 170 their preferences with respect to discovery (e.g., who can discover them and who cannot) along with potential content advertisements that may be interesting to other peers. PS in this case advertises ProSe to users based on their preferences.

FIG. 6 is a communication flow diagram illustrating another example implementation of the peer to peer discovery methods described above with reference to FIGS. 3 and 4 using AN assisted proximity detection.

Steps S605~S615 are the same as steps S505~S515 discussed above with reference to FIG. 5. Accordingly, description thereof omitted.

However, instead of sending a ProSe capability notification message from the AN 160 to the PS 170 as in step S520, in steps S620 and S625 the AN 160 sends ProSe capability notification messages to each of the first and second mobiles 110a and 110b.

With respect to the example implementation illustrated in FIG. 6, ProSe may not be advertised based on user's preferences unless PS communicates users' preferences to the access network. In such a case, the AN sends advertisements to the users based on the preferences received from PS 170. For example, according to at least one example embodiment, after determining the first and second mobiles 110a and 110b are in proximity with one another in step S615, the AN 160 may determine whether or not the first and second mobiles 110a and 110b are defined by their respective discoverability preference information as being discoverable by one another. For example, the AN 160 may obtain discoverability preference information from the PS 170. Further, the AN 160 may send the ProSe capability notification message to the first mobile 110a only if the second mobile 110b is discoverable by the first mobile 110a based on the discoverability preference information of the second mobile 110b, and the AN 160 may send the ProSe capability notification message to the second mobile 110b only if the first mobile 110a is discoverable by the second mobile 110b based on the discoverability preference information of the first mobile 110a.

In the example illustrated in FIG. 6, the AN 160 determines the first and second mobiles 110a and 110b are discoverable by one another as defined by their respective discoverability information. Accordingly, the AN 160 sends ProSe capability notification messages to each of the first and second mobiles 110a and 110b in steps S620 and S625.

In response to the ProSe capability notification messages, in steps S630 and S635 the first and second mobiles 110a and 110b send verification request messages to the PS 170. For example, the verification request messages may each request the PS 170 to verify that the first and second mobiles 110a and 110b are authorized to participate in ProSe communications.

After verifying the first and second mobiles 110a and 110b, the PS 170 may send acknowledgement messages to the first and second mobiles 110a and 110b in response to the verification request messages received in steps S630 and S635. The acknowledgment messages may respectively indicate to the mobiles 110a and 110b that the second mobile 110b and the first mobile 110a are ProSe capable neighbor mobiles. Accordingly, the first and second mobiles 110a and 110b discover each other with the help of network elements AN 160 and PS 170. The first and second mobiles 110a and 110b may now establish a D2D link according to known methods.

FIG. 7 is a communication flow diagram illustrating an example implementation of the peer to peer discovery methods described above with reference to FIGS. 3 and 4 using PS assisted proximity detection.

Steps S705~S710 are the same as steps S505~S510 and steps S605~S610 discussed above with reference to FIGS. 5 and 6. Accordingly, description thereof is omitted.

In steps S715 and S720, the first and second mobiles 110a and 110b send location updates to the PS 170. The location updates respectively indicate geographical locations of the first and second mobiles 110a and 110b. The location updates may include, for example, serving cell ID, GPS coordinates, information obtained from eNB triangulation, location information provided by application clients in the mobile device such as Google Maps [15] and Nokia Ovi Maps [16], etc, for the first and second mobiles 110a and 110b.

In step S725, the PS 170 determines that the first and second mobiles 110a and 110b are in proximity with one another. As is discussed above with reference to FIG. 3, the PS 170 may determine a current distance between the first and second mobiles based on the location updates received in steps S715 and S720. The PS 170 may then determine the first and second mobiles are within proximity of each other if the current distance is below a reference distance.

After determining the first and second mobiles 110a and 110b are within proximity of each other, the PS 170 may send proximity notification messages to the first and second mobiles 110a and 110b in steps S730 and S735.

In step S740, the first and second mobiles 110a and 110b may perform the signaling procedures necessary to establish a D2D link. For example, the first and second mobiles 110a and 110b may send proximity notification messages to the AN 160 indicating that the first and second mobiles 110a and 110b are in proximity with one another. In response, the AN 160 may determine whether or not the first and second mobiles are capable of establishing a D2D link in the manner discussed above with reference to FIGS. 3, 5 and 6. For example, the AN 160 may instruct the first and second mobiles 110a and 110b to conduct signal reception quality measurements of each other's signals, and to forward the signal measurements to the AN 160 so the AN 160 can determine whether or not the first and second mobiles are capable of establishing a D2D link. Afterwards, the steps followed may be the same as steps S520-S535 illustrated in FIG. 5.

At least two observations may be made regarding the implementation discussed above with reference to FIG. 7. First, the AN 160 needs to know or be able to obtain information about whether mobiles are ProSe capable and authorized to use ProSe. As is mentioned above with reference to FIGS. 3 and 4, information regarding ProSe authorization may be established during the mutual authentication between mobiles and the cellular network, and may become available to the AN 160 during registration of the first and second mobiles 110a and 110b.

Second, during PS registration subscribers can indicate to the Presence Server their preferences with respect to discovery (e.g., who can discover them and who cannot) along with potential content advertisements that may be interesting to other peers. PS then advertises ProSe to users based on their preferences.

PS Deployment Options

According to at least one example embodiment, the PS 170 may be a server that is part of an operator's network, for example, the AN 160. The PS 170 may use network-specific interfaces to communicate with AN 160, as well as potentially proprietary interfaces for communicating with external application servers. In this case, the PS 170 plays the role of application proxy for the mobiles, by communicating with external application servers on behalf of mobile. This allows the operator of the AN 160 to use PS 170 for offering social networking services to users. For example, the PS 170 may convey registration and location information to the user's social network servers, and obtain information from them regarding which other users are "friends". With this, PS may advertise to user Alice that only user Bob is in proximity and not user Jack, even though Alice could communicate in ProSe mode with both of them. This is because the PS may be informed than only Bob is Alice's "friend", and not Jack. With respect to a user, a "friend" may be another user with who ProSe communication may take place as defined by the PS 170.

According to at least one example embodiment, the PS 170 may be a server that is part of the Operator's network. The PS 170 uses network-specific interfaces to communicate with AN 160, while also performs application-specific tasks. In this case, PS 170 does not communicate with any external application servers, and the AN 160 uses PS 170 for internal applications that are only managed and offered by the network service provider.

According to at least one example embodiment, the PS 170 may be an external application server (e.g. a cloud service) that communicates with the AN 160. For example, the PS 170 may be a part of a social network application service, such as Facebook, Twitter, or Google+. In this case, the PS 170 is not a part of the AN 160. Similarly in this case however, the AN 160 can convey registration and location information to PS 170, and obtain information from the PS 170 regarding which users are "friends". With this, the AN 160 can make further decisions about which users should be allowed to engage into ProSe communications.

For all of the above deployment cases, PS may be performing user registration, including authentication as per one of the following options. The following options are just examples, and that other registration options are possible:

AN-agnostic PS registration: In this case, the PS 170 is capable of using independent methods of verifying that mobiles are authentic and authorized for ProSe, at the application level. As an example, the PS 170 may be interfacing with a user database which contains information about user identity and authorization information. Alternatively, OAuth and OpenID may be used for accessing the domain of the PS 170. With this, each mobile performs a separate registration procedure (including authentication and authorization) with the PS 170.

PS registration based on access network credentials: In this case, the AN 160 facilitates registration by both the PS 170 and the mobiles attached the AN 160. As an example, the 3GPP generic bootstrapping architecture (GBA) could be leveraged for this purpose. Specifically for GBA, the PS 170 would play the role of a network application function (NAF) that interfaces with the access network's bootstrap server function (BSF). For this, each ProSe-capable mobile would be equipped with a GBA client, thereby obtaining GBA credentials from universal integrated circuit card (UICC). As another example, the AN operator could offer single sign on (SSO) services for allowing subscribers to access PS using UICC authentication credentials. The use of PS registration based on access network credentials offers the advantage that the AN 160 maintains a tight control of the discovery procedure, since a user is allowed to register with the PS 170 only if the mobile has been authenticated and authorized by the AN 160 first. The AN 160 can hence block mobiles which are not authorized to use ProSe from accessing PS 170 more easily, e.g, simply by not providing credentials to PS for PS-level registration.

Advantages of Network Assisted ProSe Discovery

In contrast to conventional peer to peer discovery mechanisms, which propose that each mobile discovers neighbors via local broadcasting, the network assisted peer to peer discovery methods according to example embodiments rely on the presence of network infrastructure. In this context, the network provides assistance to mobiles for discovering each other and may optionally cooperate with a presence server for the purposes of application based discovery and content sharing/dissemination. Since the network assisted peer to peer discovery methods according to example embodiments depend on and reuse wireless network infrastructure procedures, the network assisted peer to peer discovery methods enable the operator to fully control the discovery process and apply customized policies that dictate which users are allowed to communicate in D2D fashion, when and with whom. Given this, the network assisted peer to peer discovery methods according to example embodiments can be leveraged by network operators for gaining full control of D2D communications and further offering highly optimized social networking application services and features.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of providing peer to peer discovery for a plurality of mobiles on a communications network, the plurality of mobiles including at least a first mobile and a second mobile, the method comprising:

detecting, at an access network, that the first and second mobiles are in proximity with respect to one another, the access network being included in the communications network and providing wireless coverage over one or more cells via one or more base stations included in the access network;

generating a determination result at the access network after the detecting, the determination result indicating whether the first and second mobiles are capable of establishing a direct device to device (D2D) link with one another based on a signal reception quality of signals received at the first mobile from the second mobile and a signal reception quality of signals received at the second mobile from the first mobile;

generating a D2D capability message at the access network based on the determination result, the D2D capability message indicating that the first and second mobiles are capable of establishing a D2D link with one another;

sending the D2D capability message from the access network to a proximity server which stores discoverability preference information of the plurality of mobiles;

sending a first discovery message from the proximity server to the first mobile if the discoverability preference information of the second mobile indicates that the second mobile is discoverable by the first mobile; and sending a second discovery message from the proximity server to the second mobile if the discoverability preference information of the first mobile indicates that the first mobile is discoverable by the second mobile.

2. The method of claim 1, wherein the detecting that the first and second mobiles are in proximity with one another includes, determining cell locations of each of the first and second mobiles; and determining that the first and second mobiles are in proximity with one another based on the determined cell locations of the first and second mobiles.

3. The method of claim 1, wherein when the proximity server generates proximity notification messages notifying the plurality of mobiles of their proximity to one another based on location information of the plurality mobiles stored at the proximity server, the detecting that the first and second mobiles are in proximity with one another includes, receiving a proximity indication message from at least one of the first and second mobiles at the access network, the proximity indication message being based on one of the proximity notification messages of the proximity server, and determining that the first and second mobiles are in proximity with one another based on the received proximity indication message.

4. The method of claim 1, wherein generating the determination result includes, sending a message from the access network to the first mobile for instructing the first mobile to generate signal reception quality measurements by measuring the signal reception quality of signals received at the first mobile from the second mobile;

sending a message from the access network to the second mobile for instructing the second mobile to generate signal reception quality measurements by measuring the signal reception quality of signals received at the second mobile from the first mobile;

receiving the signal reception quality measurements from the first and second mobiles at the access network; and generating the determination result based on the signal reception quality measurements received from the first and second mobiles.

5. A method of providing peer to peer discovery for a plurality of mobiles on a communications network, the plurality of mobiles including at least a first mobile and a second mobile, the method comprising:

receiving measurement instructions at the first mobile from an access network, the measurement instructions instructing the first mobile to measure a signal reception quality of a signal from the second mobile, the access network being included in the communications network and providing wireless coverage over one or more cells via one or more base stations included in the access network;

measuring the signal reception quality of a signal from the second mobile at the first mobile in response to the measurement instructions, and transmitting the signal reception quality measurements to the network element; and receiving a discovery notification message at the first mobile indicating whether the second mobile is capable of establishing a direct device to device (D2D) link with the first mobile, the discovery notification message not being received from the second mobile; and sending discoverability preference information from the first mobile to at least one of the access network and a proximity server included in the communications network, the discoverability preference information indicating which mobiles, from among the plurality of mobiles, are allowed to discover the first mobile.

6. A network element for providing peer to peer discovery for a plurality of mobiles on a communications network, the plurality of mobiles including at least a first mobile and a second mobile, the network element comprising:

a processing unit configured to detect that the first and second mobiles are in proximity with respect to one another;

generate a determination result after the detecting, the determination result indicating whether the first and second mobiles are capable of establishing a direct device to device (D2D) link with one another based on a signal reception quality of signals received at the first mobile from the second mobile and a signal reception quality of signals received at the second mobile from the first mobile;

generate a D2D capability message based on the determination result, the D2D capability message indicating that the first and second mobiles are capable of establishing a D2D link with one another;

send the D2D capability message to a proximity server which stores discoverability preference information of the plurality of mobiles;

for the proximity server to send a first discovery message to the first mobile if the discoverability preference information of the second mobile indicates that the second mobile is discoverable by the first mobile; and send a second discovery message to the second mobile if the discoverability preference information of the first mobile indicates that the first mobile is discoverable by the second mobile.

7. The network element of claim 6, wherein the network element is an access network included in the communications network, the access network being configured to provide wireless coverage over one or more cells via one or more base stations included in the access network.

8. The network element of claim 7, wherein the network element is configured to detect that the first and second mobiles are in proximity with one another by,
 determining cell locations of each of the first and second mobiles, and
 determining that the first and second mobiles are in proximity with one another based on the determined cell locations of the first and second mobiles.

9. The network element of claim 7, wherein the access network is configured such that when the proximity server generates proximity notification messages notifying the plurality of mobiles of their proximity to one another based on location information of the plurality mobiles stored at the proximity server, the network element is configured to detect that the first and second mobiles are in proximity with one another by,
 receiving a proximity indication message from at least one of the first and second mobiles at the access network, the proximity indication message being based on one of the proximity notification messages of the proximity server; and
 determining that the first and second mobiles are in proximity with one another based on the received proximity indication message.

10. The network element of claim 7, wherein the network element is configured to generate the determination result by,
 sending a message from the access network to the first mobile for instructing the first mobile to generate signal reception quality measurements by measuring the signal reception quality of signals received at the first mobile from the second mobile;
 sending a message from the access network to the second mobile for instructing the second mobile to generate signal reception quality measurements by measuring the signal reception quality of signals received at the second mobile from the first mobile;
 receiving the signal reception quality measurements from the first and second mobiles at the access network; and
 generating the determination result based on the signal reception quality measurements received from the first and second mobiles.

11. A mobile device for discovering mobiles from among a plurality of mobiles in a communications network for peer to peer communications, the mobile device comprising:
 a processing unit configured to
 receive measurement instructions from a network element, the measurement instructions instructing the mobile device to measure a signal reception quality of a signal from a peer mobile;
 measure the signal reception quality of the signal from the peer mobile in response to the measurement instructions, and transmit the signal reception quality measurements to the network element;
 receive a discovery notification message indicating whether the peer mobile is capable of establishing a direct device to device (D2D) link with the mobile device, the discovery notification message not being received from the peer mobile; and
 send discoverability preference information to at least one of the network element and a proximity server, the discoverability preference information indicating which one or more mobiles, from among the plurality of mobiles, are allowed to discover the mobile device.

12. The mobile device of claim 11, wherein the network element is an access network included in the communications network and configured to provide wireless coverage for the mobile device over one or more cells via one or more base stations included in the access network.

\* \* \* \* \*